Patented Mar. 7, 1950

2,500,009

UNITED STATES PATENT OFFICE 2,500,009

CHLOROALKYL ACYLATES

Robert H. Saunders, Wilmington, Del., assignor to Hercules Powder Company, Wilmington, Del., a corporation of Delaware No Drawing. Application August 9, 1946,
Serial No. 689,506

11 Claims. (Cl. 260—476)

This invention relates to the preparation of new esters and more particularly to esters containing a terminal polychloromethyl group in the alcohol portion of the ester molecule.

When carbon tetrachloride is reacted with ethylene in the presence of an organic peroxide, a reaction occurs which involves polymerization of the ethylene and at the same time addition of the carbon tetrachloride whereby a chlorinated hydrocarbon is produced having three chlorine atoms on one terminal carbon atom and one chlorine atom on the other terminal carbon atom. these alpha-trichloro-omega-chloroalkanes are known to undergo many reactions such as dehydrohalogenation and hydrolysis, all of which reactions involve the terminal trichloromethyl group, the chlorine atom of the terminal monochloromethyl group being unaffected by these reactions.

Now in accordance with this invention it has been found that an ester having the formula

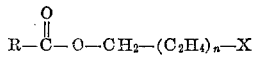

where R is a hydrocarbon radical, $n$ is a whole number of from one to twelve, and X is a radical selected from the group consisting of —$CH_2$—$CCl_3$ and —$CH$=$CCl_2$, may be prepared by reacting an alpha-trichloro-omega-chloroalkane with an alkali metal salt of an organic acid.

Since in the known reactions of alpha-trichloro-omega-chloroalkanes the terminal trichloromethyl group was involved, it would be expected that the trichloromethyl group would enter into ester formation in the present instance. However, contrary to expectations, it has been discovered that the chlorine atom of the monochloromethyl group will react with the alkali metal salt to form an ester. Thus, it has been possible to prepare an ester containing a terminal polychloromethyl group in the alcohol portion of the ester molecule.

The following examples illustrate the preparation of the new esters in accordance with this invention. All parts and percentages are by weight unless indicated.

Example I

A mixture of 428.5 parts of 1,1,1,7-tetrachloroheptane, 500 parts of anhydrous sodium acetate and 500 parts of glacial acetic acid were heated to 150–157° C. and held at that temperature for 16 hours with agitation. The reaction mixture was cooled, diluted with 600 parts of water and extracted twice with 200 parts of ether. The combined ether extracts were washed free of acetic acid and the ether was removed by distillation. The crude product had a chlorine content of 38.1% (theory=40.8%) and a saponification number of 198.5 (theory=214). On distillation 400 parts of omega-trichloroheptyl acetate having a boiling point of 145–155° C. at 14 mm. were obtained.

Example II

A mixture of 120 parts of 1,1,1,7-tetrachloroheptane, 100 parts of sodium acetate and 200 parts of glacial acetic acid were heated in a sealed autoclave for 5 hours at 180–200° C. The reaction mixture was then cooled, diluted with water and extracted twice with 150 parts of ether. The ether extracts were distilled to remove the ether and obtain a fraction boiling at 114–120° C. at 2.8 mm. and having an $n_D^{20}$ of 1.4683. The omega-dichloroheptenyl acetate was analyzed and found to contain 31.5% chlorine (theory=31.0%) and to have a saponification number of 249 (theory=260).

Example III

Butyric acid, 210 parts, was mixed with 32 parts of sodium hydroxide and the water formed was removed by distillation. To this solution of sodium butyrate in butyric acid was added 60 parts of 1,1,1,5-tetrachloropentane and the reaction mixture was agitated and heated to 160° C. for 17 hours. After cooling, the reaction mixture was diluted with 200 parts of ether and the unreacted butyric acid was extracted with aqueous sodium carbonate. The ethereal solution was distilled to obtain ω-trichloropentyl butyrate having a boiling point of 112–115° C. at 2 mm. and containing 40.5% chlorine (theory=40.7%).

Example IV

A mixture of 75 parts of benzoic acid, 25 parts of sodium benzoate, 30 parts of 1,1,1,5-tetrachloropentane, and 60 parts of cyclohexanone was agitated and heated to 150–160° C. for 20 hours. After cooling, the reaction mixture was extracted successively with sodium bisulfite solution, sodium carbonate solution, and water. The ester which remained as a residue was dissolved in ether, dried and distilled. The ω-trichloropentyl benzoate had a boiling point of 125–135° C. at 0.5 mm. and contained 35.0% chlorine (theory=36.0%).

Example V

A mixture of 150 parts of acetic acid, 125 parts of sodium acetate, and 50 parts of a mixture of alpha-trichloro-omega-chloroalkanes having a chlorine content of 34.6% (which corresponds to an average carbon chain of about 19 carbon atoms) was agitated and heated to reflux temperature for 17 hours. Water, 200 parts, was then added and the reaction mixture was extracted with benzene. The benzene, acetic acid and water were distilled off under reduced pressure to leave 47.6 parts of the high molecular weight ω-trichloroalkyl acetate. This ester had a chlorine content of 26.6% (theory for the ester of a 19 carbon alkyl chain=24.8%) and a saponification number of 122.

The esters containing a terminal polychloromethyl group in the alcohol portion of the molecule are prepared from tetrachloroalkanes which have three chlorine atoms on one terminal carbon atom and one chlorine atom on the other terminal chlorine atom. These tetrachloroalkanes may be prepared by the addition-polymerization reaction of ethylene and carbon tetrachloride. The reaction is usually carried out in the presence of an organic peroxide such as benzoyl peroxide, acetyl peroxide, etc., and under pressure. The length of the carbon chain of the product of this reaction is dependent upon the degree of polymerization of the ethylene under the conditions of the reaction. Thus, the simplest product obtained is that formed by the polymerization of two molecules of ethylene and addition of carbon tetrachloride and has the formula $$ClCH_2-(C_2H_2)-CH_2-CCl_3$$

A general formula for these addition-polymerization products of ethylene and carbon tetrachloride may be represented as $$ClCH_2-(C_2H_4)_n-CH_2-CCl_3$$

where $n$ is at least one, since they differ from one another by a multiple of the ethylene unit. The product may be a mixture of the homologs differing by one $C_2H_4$ unit, or it may be substantially one compound, depending upon the conditions under which the reaction is carried out. For example, if the conditions are carefully controlled it is possible to obtain a product which is chiefly 1,1,1,5-tetrachloropentane. However, it is also possible to carry out the reaction to produce the higher homologs, or a mixture of them, such as 1,1,1,7-tetrachloroheptane, 1,1,1,9-tetrachlorononane, etc., compounds containing up to twenty-five and twenty-seven carbon atoms having been prepared. Thus, any desired molecular weight tetrachloroalkane, which may be a single compound or a mixture of homologs, may be obtained. The mixture of homologous compounds may then be fractionally distilled to separate the various compounds or the mixture may be used in the reaction of this invention to produce a mixture of esters differing by two carbon atoms in the length of the carbon chain in the alcohol portion of the molecule.

In the reaction between the tetrachloroalkane and the alkali metal acylate in accordance with this invention the chlorine atom of the monochloromethyl group is replaced by the acyl group to produce an omega-trichloroalkyl acylate. If an omega-dichloroalkenyl acylate is desired the reaction is carried out at a higher temperature or under pressure whereby both the esterification reaction and a dehydrohalogenation reaction between the trichloromethyl group and the adjoining $CH_2$ group occurs. The product of this reaction is an ester containing a terminal polychloromethyl group in the alcohol portion of the molecule which may be represented by the formula $$R-\overset{O}{\underset{\|}{C}}-O-CH_2-(C_2H_4)_n-X$$

where R is the hydrocarbon radical of the acid and $n$ is a small whole number of one to twelve and X is the group $-CH_2-CCl_3$ or $-CH=CCl_2$.

Thus, if the tetrachloroalkane used in the reaction is 1,1,1,5-tetrachloropentane, the product is an omega-trichloropentyl acylate or an omega-dichloropentenyl acylate depending upon the temperature or pressure at which the reaction is carried out.

The reaction between the tetrachloroalkane and the alkali metal salt of the organic acid is readily carried out by heating the tetrachloroalkane with the alkali metal acylate in an organic solvent to a temperature of about 120° C. to about 240° C. If an omega-trichloroalkyl acylate is desired the reaction should be carried out at a temperature of about 120° C. to about 170° C. If an omega-dichloroalkenyl acylate is desired the reaction should be carried out at a temperature of about 170° C. to about 240° C. If desired the reaction may be carried out under superatmospheric pressure in order to attain the desired temperature range. Any convenient organic solvent may be used in carrying out the reaction as, for example, the acid corresponding to the acylate radical of the alkali metal acylate such as acetic acid, butyric acid, benzoic acid, etc., or an organic solvent such as acetone, dioxane, cyclohexanone and anhydrous alcohols.

The esters in accordance with this invention may be prepared from an alkali metal salt of any organic acid as, for example, an aliphatic acid such as acetic acid, propionic acid, butyric acid, etc., or an aromatic acid such as benzoic acid, salicylic acid, etc. Esters of dicarboxylic acids may also be prepared by using the alkali metal salts of the dicarboxylic acids such as maleic acid, phthalic acid, etc. Any alkali metal salt may be used such as sodium, potassium, ammonium, etc. The term "alkali metal salt" as used in the specification and claims of this application is meant to include the ammonium salts as the equivalent of the alkali metal salts.

The esters containing a terminal polychloromethyl group in the alcohol portion of the ester molecule in accordance with this invention are useful as plasticizers for polyvinyl chloride and other polymers and as nonflammable lacquer solvents.

What I claim and desire to protect by Letters Patent is:

1. The process of preparing an ester selected from the group consisting of omega-trichloroalkyl and omega-dichloroalkenyl esters of aliphatic and aromatic carboxylic acids, which comprises heating an alpha-trichloro-omega-chloroalkane, having the formula $$ClCH_2-(C_2H_4)_n-CH_2-CCl_3$$

where $n$ is a whole number of from one to twelve, with an alkali metal salt of an acid selected from the group consisting of aliphatic and aromatic carboxylic acids in an organic solvent to a temperature of about 120° C. to about 240° C.

2. The process of preparing omega-trichloroalkyl esters of aliphatic and aromatic carboxylic acids which comprises heating an alpha-trichloro-omega-chloroalkane, having the formula $$ClCH_2-(C_2H_4)_n-CH_2-CCl_3$$

where $n$ is a whole number of from one to twelve, with an alkali metal salt of an acid selected from the group consisting of aliphatic and aromatic carboxylic acids in an organic solvent to a temperature of from about 120° C. to about 170° C. and recovering said omega-trichloroalkyl ester.

3. The process of preparing omega-dichloroalkenyl esters of aliphatic and aromatic carboxylic acids which comprises heating an alpha-trichloro-omega-chloroalkane, having the formula $$ClCH_2-(C_2H_4)_n-CH_2-CCl_3$$

where $n$ is a whole number of from one to twelve, with an alkali metal salt of an acid selected from the group consisting of aliphatic and aromatic carboxylic acids in an organic solvent to a temperature of from about 170° C. to about 240° C. and recovering said omega-dichloroalkenyl ester.

4. The process of preparing omega-trichloroalkyl esters of aliphatic carboxylic acids which comprises heating an alpha-trichloro-omega-chloroalkane, having the formula $$ClCH_2-(C_2H_4)_n-CH_2-CCl_3$$

where $n$ is a whole number of from one to twelve, with an alkali metal salt of an aliphatic carboxylic acid in an organic solvent to a temperature of from about 120° C. to about 170° C. and recovering said omega-trichloroalkyl ester.

5. The process of preparing omega-trichloroalkyl esters of aromatic carboxylic acids which comprises heating an alpha-trichloro-omega-chloroalkane, having the formula $$ClCH_2-(C_2H_4)_n-CH_2-CCl_3$$

where $n$ is a whole number of from one to twelve, with an alkali metal salt of an aromatic carboxylic acid in an organic solvent to a temperature of from about 120° C. to about 170° C. and recovering said omega-trichloroalkyl ester.

6. The process of preparing omega-dichloroalkenyl esters of aliphatic carboxylic acids which comprises heating an alpha-trichloro-omega-chloroalkane, having the formula $$ClCH_2-(C_2H_4)_n-CH_2-CCl_3$$

where $n$ is a whole number of from one to twelve, with an alkali metal salt of an aliphatic carboxylic acid in an organic solvent to a temperature of from about 170° C. to about 240° C. and recovering said omega-dichloroalkenyl ester.

7. The process of preparing omega-dichloroalkenyl esters of aromatic carboxylic acids which comprises heating an alpha-trichloro-omega-chloroalkane, having the formula $$ClCH_2-(C_2H_4)_n-CH_2-CCl_3$$

where $n$ is a whole number of from one to twelve, with an alkali metal salt of an aromatic carboxylic acid in an organic solvent to a temperature of from about 170° C. to about 240° C. and recovering said omega-dichloroalkenyl ester.

8. A process for the preparation of omega-trichloroheptyl acetate which comprises heating 1,1,1,7-tetrachloroheptane in an organic solvent with sodium acetate to a temperature of about 120° C. to about 160° C. and recovering said omega-trichloroheptyl acetate.

9. A process for the preparation of omega-dichloroheptenyl acetate which comprises heating 1,1,1,7-tetrachloroheptane in an organic solvent with sodium acetate to a temperature of about 180° C. to about 200° C. under superatmospheric pressure and recovering said omega-dichloroheptenyl acetate.

10. A process for the preparation of omega-trichloropentyl butyrate which comprises heating 1,1,1,5-tetrachloropentane in an organic solvent with sodium butyrate to a temperature of about 150° C. to about 160° C. and recovering said omega-trichloropentyl butyrate.

11. A process for the preparation of omega-trichloropentyl benzoate which comprises heating 1,1,1,5-tetrachloropentane in an organic solvent with sodium benzoate to a temperature of from about 150° C. to about 160° C. and recovering said omega-trichloropentyl benzoate.

ROBERT H. SAUNDERS.

REFERENCES CITED

The following references are of record in the file of this patent:

UNITED STATES PATENTS

| Number | Name | Date |
|---|---|---|
| 2,049,207 | Lawson | July 28, 1936 |
| 2,192,299 | Collins | Mar. 5, 1940 |
| 2,375,301 | Joyce | May 8, 1945 |
| 2,396,261 | Harmon | Mar. 12, 1946 |

FOREIGN PATENTS

| Number | Country | Date |
|---|---|---|
| 673,246 | Germany | May 7, 1940 |

OTHER REFERENCES

Braun, "Chem. Abstracts," vol. 7 (1913), p. 2755.
Paul, "Comp. Rendus," vol. 193 (1931), pp. 598–600.

Certificate of Correction

Patent No. 2,500,009 March 7, 1950

ROBERT H. SAUNDERS

It is hereby certified that error appears in the printed specification of the above numbered patent requiring correction as follows:

Column 3, line 25, for that portion of the formula reading "$(C_2H_2)$" read $(C_2H_4)$; and that the said Letters Patent should be read with this correction therein that the same may conform to the record of the case in the Patent Office.

Signed and sealed this 30th day of May, A. D. 1950.

[SEAL]

THOMAS F. MURPHY,
*Assistant Commissioner of Patents.*